United States Patent
Mukherjee et al.

(10) Patent No.: US 12,278,720 B2
(45) Date of Patent: Apr. 15, 2025

(54) TRANSMIT SPUR DETECTION AND MITIGATION FOR WIRELESS COMMUNICATIONS DEVICES

(71) Applicant: Cypress Semiconductor Corporation, San Jose, CA (US)

(72) Inventors: Suprojit Mukherjee, Nadia (IN); Ayush Sood, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/490,605

(22) Filed: Oct. 19, 2023

(65) Prior Publication Data

US 2024/0113921 A1    Apr. 4, 2024

Related U.S. Application Data

(63) Continuation of application No. 17/951,626, filed on Sep. 23, 2022, now Pat. No. 11,804,993, which is a continuation of application No. 17/032,991, filed on Sep. 25, 2020, now Pat. No. 11,456,901.

(51) Int. Cl.
*H04L 25/03* (2006.01)
*H04L 25/497* (2006.01)

(52) U.S. Cl.
CPC .... *H04L 25/0328* (2013.01); *H04L 25/03292* (2013.01); *H04L 25/03299* (2013.01); *H04L 25/03305* (2013.01); *H04L 25/497* (2013.01)

(58) Field of Classification Search
CPC .......... H04L 25/0328; H04L 25/03292; H04L 25/03299; H04L 25/03305; H04L 25/497
See application file for complete search history.

(56) References Cited

U.S. PATENT DOCUMENTS

| | | | | |
|---|---|---|---|---|
| 11,146,276 | B2* | 10/2021 | Karandikar | H03L 7/085 |
| 2006/0281425 | A1* | 12/2006 | Jungerman | G06F 1/0321 |
| | | | | 455/183.1 |
| 2007/0153878 | A1* | 7/2007 | Filipovic | H04B 1/1036 |
| | | | | 375/147 |
| 2010/0296568 | A1* | 11/2010 | Bury | H04L 27/2647 |
| | | | | 375/346 |
| 2011/0007839 | A1* | 1/2011 | Tang | H03F 3/195 |
| | | | | 375/296 |
| 2012/0149320 | A1* | 6/2012 | Su | H04B 1/1036 |
| | | | | 455/226.2 |
| 2016/0359493 | A1* | 12/2016 | Chen | H03L 7/099 |
| 2018/0292480 | A1* | 10/2018 | Brunner | G01R 33/3621 |

* cited by examiner

*Primary Examiner* — Freshteh N Aghdam

(57) ABSTRACT

Systems, methods, and devices reduce and mitigate spurs that may occur in transmit waveforms of wireless communications devices. Methods include beginning transmission of a portion of a data packet from a baseband layer of a wireless communications device, and generating a spur canceling signal based on an estimated magnitude and an estimated phase of a spur signal at identified spur frequencies of a frequency band used for the transmission. Methods also include subtracting the spur canceling signal from the transmission of the portion of the data packet, and generating a transmitted signal based on the subtracting such that the spur canceling signal is subtracted during the transmission of the portion of the data packet.

20 Claims, 13 Drawing Sheets

TRANSMIT SPUR DETECTION AND MITIGATION FOR WIRELESS COMMUNICATIONS DEVICES

CROSS-REFERENCE TO RELATED APPLICATION

This application is a Continuation of U.S. patent application Ser. No. 17/951,626, filed on Sep. 23, 2022, now U.S. Pat. No. 11,804,993 issued on Oct. 31, 2023, which is a Continuation of U.S. patent application Ser. No. 17/032,991, filed Sep. 25, 2020, U.S. Pat. No. 11,456,901 issued on Sep. 27, 2022, all which are incorporated by reference herein in their entirety.

TECHNICAL FIELD

This disclosure generally relates to wireless communications devices, and more specifically, to spur detection and mitigation for such wireless communications devices.

BACKGROUND

Wireless communications devices may communicate with each other via one or more communications modalities, such as a WiFi connection or a Bluetooth connection. Accordingly, such wireless communication may be implemented in a manner compliant with a wireless communication protocol. Moreover, such wireless communications devices may include various hardware components to facilitate such communication. For example, wireless communications devices may include transmission media that may include one or more antennas. Conventional techniques for transmitting data over a network via such transmission media remain limited because they are not able to efficiently and effectively reduce and mitigate spectral spurs that may occur while transmitting.

DETAILED DESCRIPTION

Figure 1:
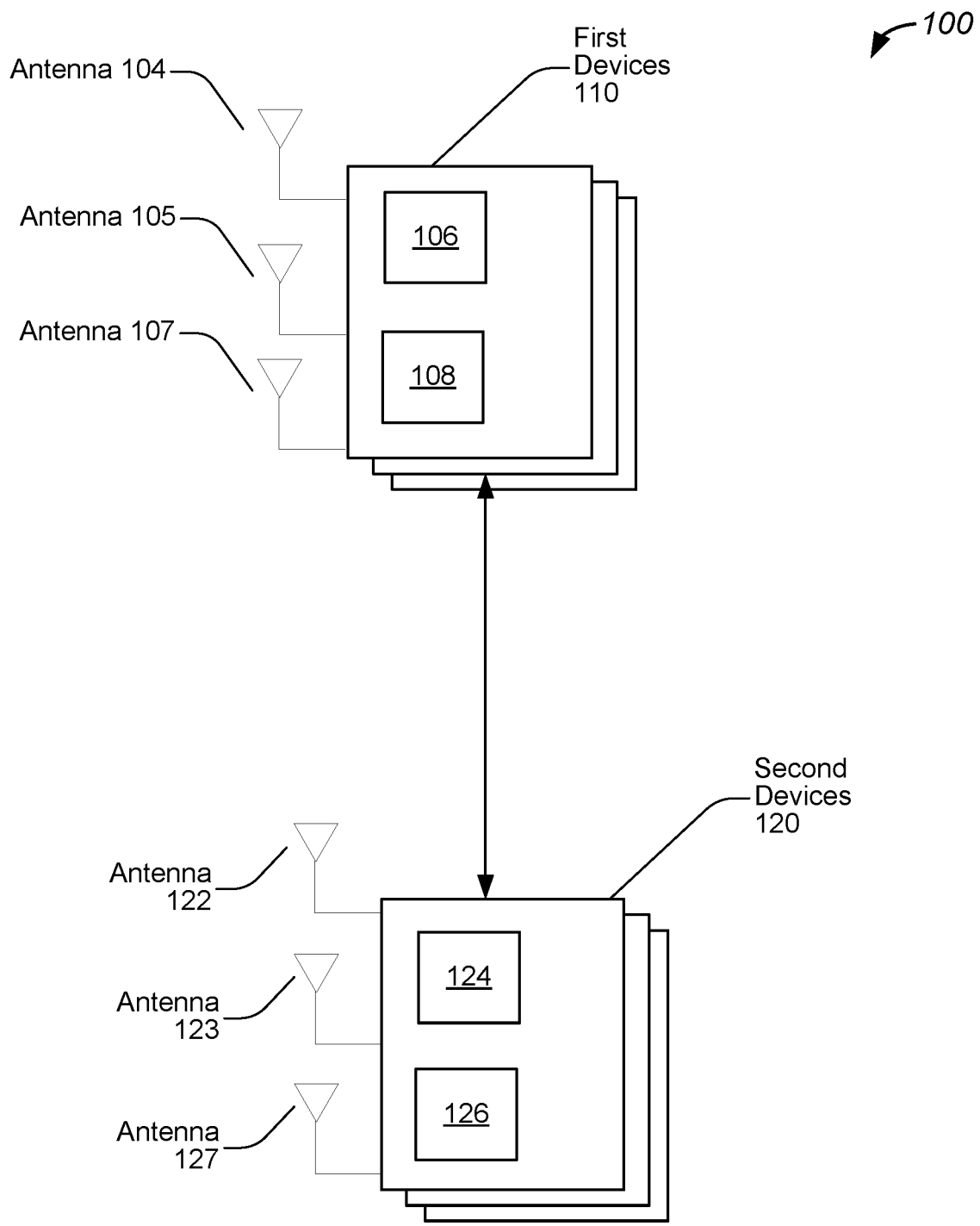
FIG. 1 illustrates a diagram of an example of a system for spur reduction and mitigation, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may be implemented in a variety of contexts and environments. For example, wireless communications devices may be implemented in computing devices, mobile devices, and other computing environments. In one example, wireless communications devices may be implemented in vehicles to provide communication between components of the vehicle, such as an on-board computer, and other computing devices, such as a mobile device, a cellular network, or another communications network. In another example, wireless communications devices may be implemented in various Internet of Things (IoT) devices. The wireless communications devices may include transceivers that handle transmit and receive operations in accordance with wireless communications protocols.

During implementations of transmission operations, device and component characteristics, as well as interference from other components, may result in transmission of frequencies outside of a transmission band. Accordingly, such transmissions may be out of band transmissions that occur in frequencies falling outside of a range of frequencies included in a communications band, as may be determined by a wireless communications protocol. In one example, such out of band transmissions may occur as a result of one or more components of a wireless communications device, such as a baseband physical layer. Furthermore, such out of band transmissions may be referred to as spurs or spur components. As will be discussed in greater detail below, the magnitude of such spurs may be so great that they limit an overall transmit power available to the wireless communications device. Accordingly, such spur components may be spectral spikes in a transmit waveform of a wireless communication device, and such spectral spikes may have amplitudes large enough to limit the transmit power available to other frequencies of the transmit waveform.

Embodiments disclosed herein provide methods, devices, and systems for spur reduction and mitigation associated with wireless communications devices. As will be discussed in greater detail below, wireless communications devices disclosed herein are configured to detect spur frequencies and mitigate band spur components at such spur frequencies. In this way, wireless communications devices are configured to reduce power consumption of wireless communications devices associated with the transmission of such band spur components, and an increase in available transmit power for transmitted data signals.

FIG. 1 illustrates a diagram of an example of a system for spur reduction and mitigation, configured in accordance with some embodiments. As discussed above, various wireless communications devices may communicate with each other via one or more wireless communications media. For example, wireless communications devices may communicate with each other via a WiFi connection or a Bluetooth connection. In various embodiments, the wireless communications devices may first establish connections or communications links before data transfer occurs. As will be discussed in greater detail below, wireless communications devices disclosed herein and systems, such as system 100, that implement such wireless communications devices are configured to mitigate and reduce band spurs that may otherwise occur when such devices transmit data. Accordingly, embodiments disclosed herein enable the improvement and enhancement of transmission of data between wireless communications devices.

In various embodiments, system 100 may include first devices 110 which may be wireless communications devices. As discussed above, such wireless communications devices may be compatible with one or more wireless transmission protocols, such as a WiFi protocol, a Bluetooth transmission protocol, or any other protocol, such as a Zigbee protocol. Accordingly, first devices 110 may include one or more transceivers and associated hardware to implement communications protocols compatible with Bluetooth as well as wireless local area network (WLAN). In some embodiments, first devices 110 are low energy Bluetooth devices that are compatible with a Bluetooth Low Energy specification and protocol, also referred to as Bluetooth Smart. Moreover, such wireless communications devices may be smart devices, such as those found in wearable devices, or may be monitoring devices, such as those found in smart buildings, environmental monitoring, and energy management. In some embodiments, such devices may be monitoring devices found in automobiles or other vehicles. Accordingly, wireless communications devices disclosed herein may be any suitable device, such as those found in cars, other vehicles, and even medical implants.

As shown in FIG. 1, various wireless communications devices may be in communication with each other via one or more wireless communications mediums. As shown in FIG. 1, first devices 110 may each include one or more antennas, such as antenna 104, antenna 105, and antenna 107. First devices 110 may also include various hardware components, such as transceiver 106 as well as processing device 108. As will be discussed in greater detail below, processing devices, transceivers, and radios may be configured to establish communications connections with other devices, and transmit data in the form of data packets via such communications connections.

As will also be discussed in greater detail below, different components of first devices 110, such as transceivers and processing devices, are configured to mitigate and reduce band spurs that may occur when data is transmitted. For example, components of first devices 110 are configured to identify and detect spur frequencies and characteristics, such as amplitude and phase, of signals present at such spur frequencies. Furthermore, components of first devices 110 are further configured to generate a cancelation signal that cancels the spur components at the spur frequencies during data transmission. In this way, band spurs may be reduced during data transmission, and transmit power usage of first devices 110 is improved.

In some embodiments, system 100 further includes second devices 120 which may also be wireless communications devices. As similarly discussed above, second devices 120 may be compatible with one or more wireless transmission protocols, such as a WiFi protocol or a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include one or more antennas, such as antenna 122, antenna 123, antenna 127, as well as transceiver 124 and processing device 126, which may also be configured to establish communications connections with other devices, and transmit data in the form of data packets via such communications connections. As discussed above, second devices 120 may also be configured to mitigate and reduce band spurs that may occur during data transmission, thus enhancing communications between first devices 110 and second devices 120.

Figure 2:
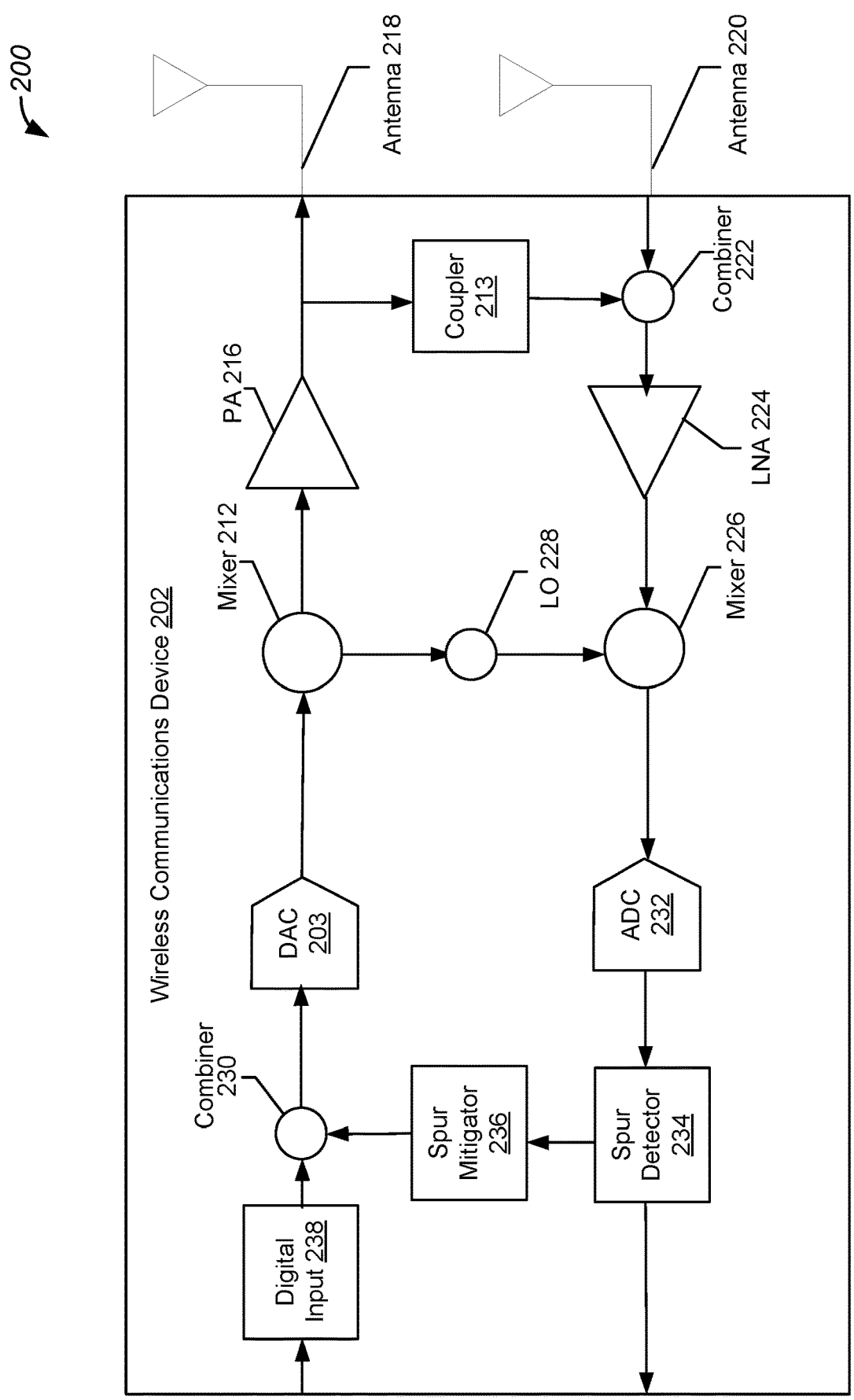
FIG. 2 illustrates a diagram of an example of a device for spur reduction and mitigation, configured in accordance with some embodiments.

FIG. 2 illustrates a diagram of an example of a device for spur reduction and mitigation, configured in accordance with some embodiments. As will be discussed in greater detail below, a wireless communications device, such as wireless communications device 202, may be configured to detect spur frequencies and mitigate band spur components at such spur frequencies. In this way, wireless communications device 202 may be configured to reduce power consumption of wireless communications device 202 associated with the transmission of such band spur components, and an increase in available transmit power for transmitted data signals.

In various embodiments, wireless communications device 202 includes a transmit path configured to transmit data, and also includes a receive path configured to received data. More specifically, wireless communications device 202 includes a transmit path that is used by a transceiver to transmit data in accordance with a wireless communications protocol. In various embodiments, the transmit path includes digital input 238, combiner 230, digital to analog converter 203, mixer 212, and power amplifier 216. Wireless communications device 202 further includes a receive path that is used by the transceiver to receive data. The receive path includes, among other components, combiner 222, low noise amplifier 224, mixer 226, and analog to digital converter 232.

In various embodiments, the transmit path may be coupled to the receive path at one or more tap off points or loopback paths. Accordingly, wireless communications device 202 also includes local oscillator 228 coupled to mixer 212 and mixer 226. Wireless communications device 202 further includes coupler 213 that is configured to provide a path from an output of power amplifier 216 and an input of combiner 222. Additional components of wireless communications device 202, such as modulators and demodulators, are not shown for clarity.

In various embodiments, wireless communications device 202 further includes components to implement the spur mitigation and reduction described above and in greater detail below. For example, wireless communications device 202 includes spur detector 234, which may be included in a receive path, and spur mitigator 236 which may be coupled between spur detector 234 and combiner 230. As will be discussed in greater detail below, spur detector 234 is configured to identify spur frequencies, and identify components of signals present at such spur frequencies. Accordingly, spur detector 234 is configured to generate an estimation of an amplitude and phase of spur components occurring at spur frequencies. Moreover, spur mitigator 236 is configured to generate a cancelation signal that is configured to substantially cancel such estimated components of the spur components during data transmission. Thus, the estimated spur components may be canceled partially or substantially. In some embodiments, the estimated spur components are canceled entirely. Accordingly, spur detector 234 may identify aspects and parameters of a band spur component, while spur mitigator 236 generates a cancelation signal that is combined with a transmitted signal, via combiner 230, to cancel band spur components. In various embodiments, spur detector 234 and spur mitigator 236 are implemented in a processing device, as will be discussed in greater detail below with reference to FIG. 3.

Figure 3:
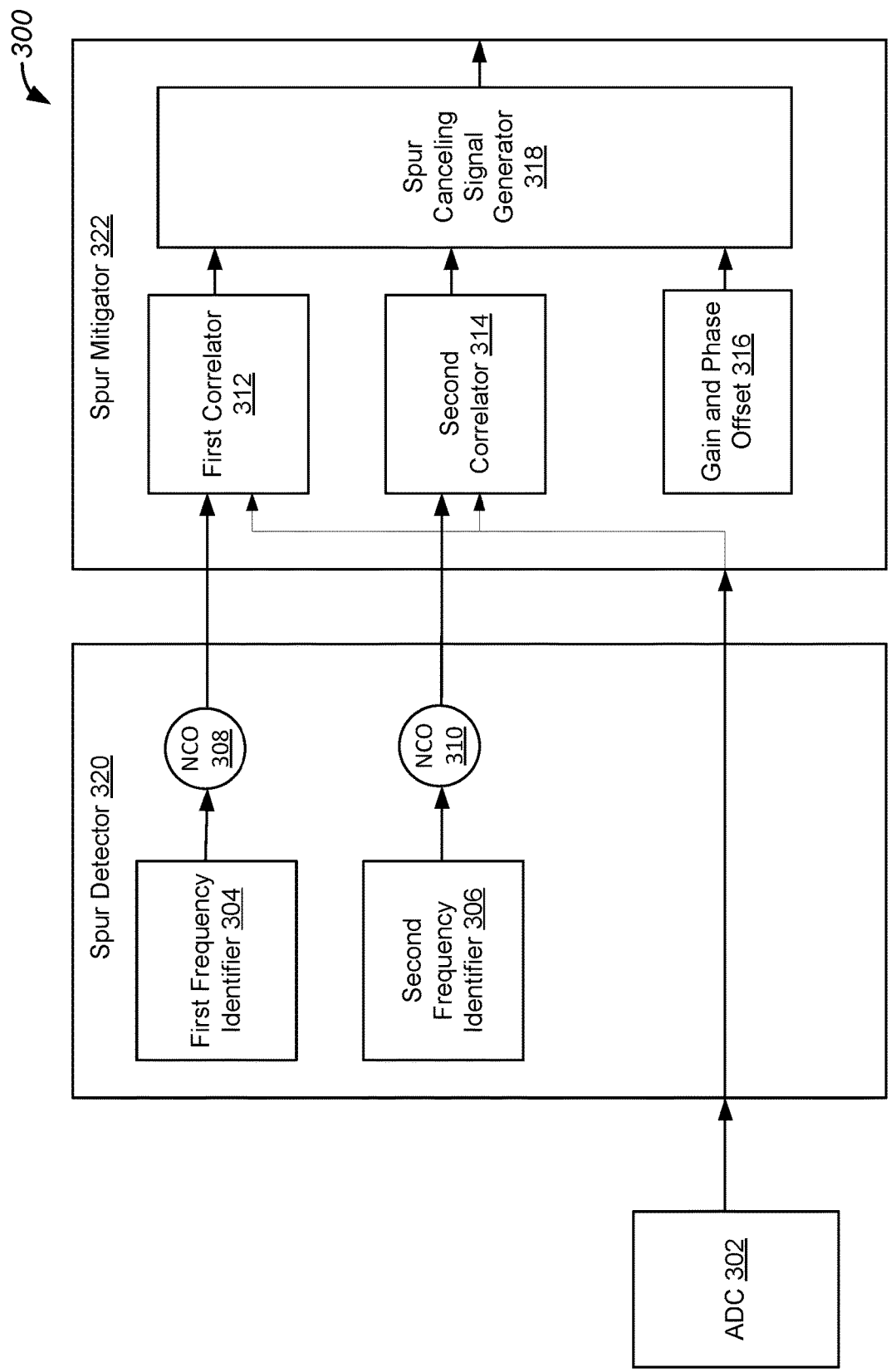
FIG. 3 illustrates a diagram of another example of a device for spur reduction and mitigation, configured in accordance with some embodiments.

FIG. 3 illustrates a diagram of another example of a device for spur reduction and mitigation, configured in accordance with some embodiments. As discussed above, devices disclosed herein, such as device 300, may include spur detectors and spur mitigators that are configured to identify and cancel band spur components present during data transmission. Accordingly, as will be discussed in greater detail below, a spur detector and spur mitigator may be configured to generate a cancelation signal to cancel such band spur components.

In various embodiments, device 300 includes spur detector 320. As shown in FIG. 3, spur detector may include frequency identifiers and oscillators that are configured to generate signals used by spur mitigator 322, described in greater detail below, to generate a cancelation signal. Moreover, spur detector 320 may be configured to receive an input from analog to digital converter 302. As discussed above with reference to FIG. 2, analog to digital converter 302 may be a component of a receive path of a wireless communications device. In some embodiments, the input received from analog to digital converter 302 may be passed through to spur mitigator 322.

As also shown in FIG. 3, spur detector 320 may include various components such as first frequency identifier 304 and second frequency identifier 306. In various embodiments, first frequency identifier 304 and second frequency identifier 306 are configured to identify one or more designated frequencies. Moreover, such designated frequencies may have been previously determined by an entity, such as a user or an administrator. Spur mitigator 322 may further include one or more oscillators, such as numerically controlled oscillator 308 and numerically controlled oscillator 310, that are configured to generate reference signals. In various embodiments, numerically controlled oscillator 308 is configured to receive an output from first frequency identifier 304, and is further configured to generate a first signal based on the identified frequency. As will be discussed in greater detail below, the first signal may be a sinusoid signal having a frequency determined based on the first frequency. Moreover, numerically controlled oscillator 310 is configured to receive an output from second frequency identifier 306, and is further configured to generate a second signal based on the identified frequency. As will also be discussed in greater detail below, the second signal may be a sinusoid signal having a frequency determined based on the second frequency.

As additionally shown in FIG. 3, device 300 further includes spur mitigator 322 which, as discussed above, is configured to generate a cancelation signal. In various embodiments, spur mitigator 322 includes various components that are configured to correlate an outgoing signal, as may be fed back via analog to digital converter 302, with one or more of the first or second signals in order to estimate components of a spur component that may be present in the outgoing signal.

More specifically, spur mitigator 322 may include one or more correlators, such as first correlator 312 and second correlator 314 that are each configured to receive signals from the numerically controlled oscillators and analog to digital converter 302, and are further configured to correlate the received inputs to estimate a magnitude and phase at a spur frequency. For example, first correlator 312 may receive the first signal from numerically controlled oscillator 308 and an output of analog to digital converter 302. Moreover, second correlator 314 may receive the second signal from numerically controlled oscillator 310 and the output of analog to digital converter 302. Each of first correlator 312 and second correlator 314 is configured correlate its respective inputs using equation 1 shown below:

$$<x(n), \exp(-j\omega n)> = \frac{1}{w}\sum x(n-k)\exp(j(\omega n + \theta)) = a + jb = A\exp(j(\omega n + \theta)) \quad (1)$$

Accordingly, equation 1 may be used to estimate the magnitude and phase of a spur component at a spur frequency over a moving window w and a spur frequency $\omega$. The result of the implementation of equation 1 is an estimate of an amplitude (A) and phase ($\theta$) at a spur frequency ($\omega$), and such an estimate may be made at the last window of the moving windows.

Device 300 further includes spur mitigator 322 which includes various components configured to generate a cancelation signal, as discussed above. Accordingly, spur mitigator 322 may be configured to also include spur canceling signal generator 318 and gain and phase offset 316. In various embodiments, spur canceling signal generator 318 is a signal generator configured to generate a signal based on the outputs provided by first correlator 312, second correlator 314, as well as gain and phase offset 316. In various embodiments, gain and phase offset 316 is configured to store one or more gain and phase parameters that counteract or cancel an estimate of gain and phase components introduced by components of a feedback path, such as a coupler. In some embodiments, the gain and phase parameters stored in gain and phase offset 316 may be the opposite or inverse of the estimated gain and phase components of the feedback path at each of the identified spur frequencies. Accordingly, such gain and phase parameters as well as outputs of the correlators may be fed to spur canceling signal generator 318 which generates a canceling signal that is combined with a transmitted signal in a transmit path. In various embodiments, the estimated amplitude and phase discussed above may be used as inputs to equation 2 shown below to generate a cancelation signal:

$$y(n)=x(n)-A\exp(j(\omega n+\theta)) \quad (2)$$

Accordingly, equation 2 may be used to generate a cancelation signal that is provided as an output of spur mitigator 322. As previously discussed, the cancelation signal may be used to subtract the spur sinusoid from a current window of an outgoing spectrum of a transmitted signal. In various embodiments, a window may be defined as a portion of a sampled signal having a designated number of samples. Moreover, the correlation operations discussed above may be implemented for a first window, and subsequently implemented for a second window until all windows have been processed. When proceeding from the first window to the second window, the spur canceling signal may be subtracted from the second window. As discussed above, that spur canceling signal may have been generated based on estimates that were generated based on samples in the first window. The correlation operations may then be implemented on the second window to generate new estimates of phase and amplitude, and this may repeat until all windows have been processed.

Figure 4:
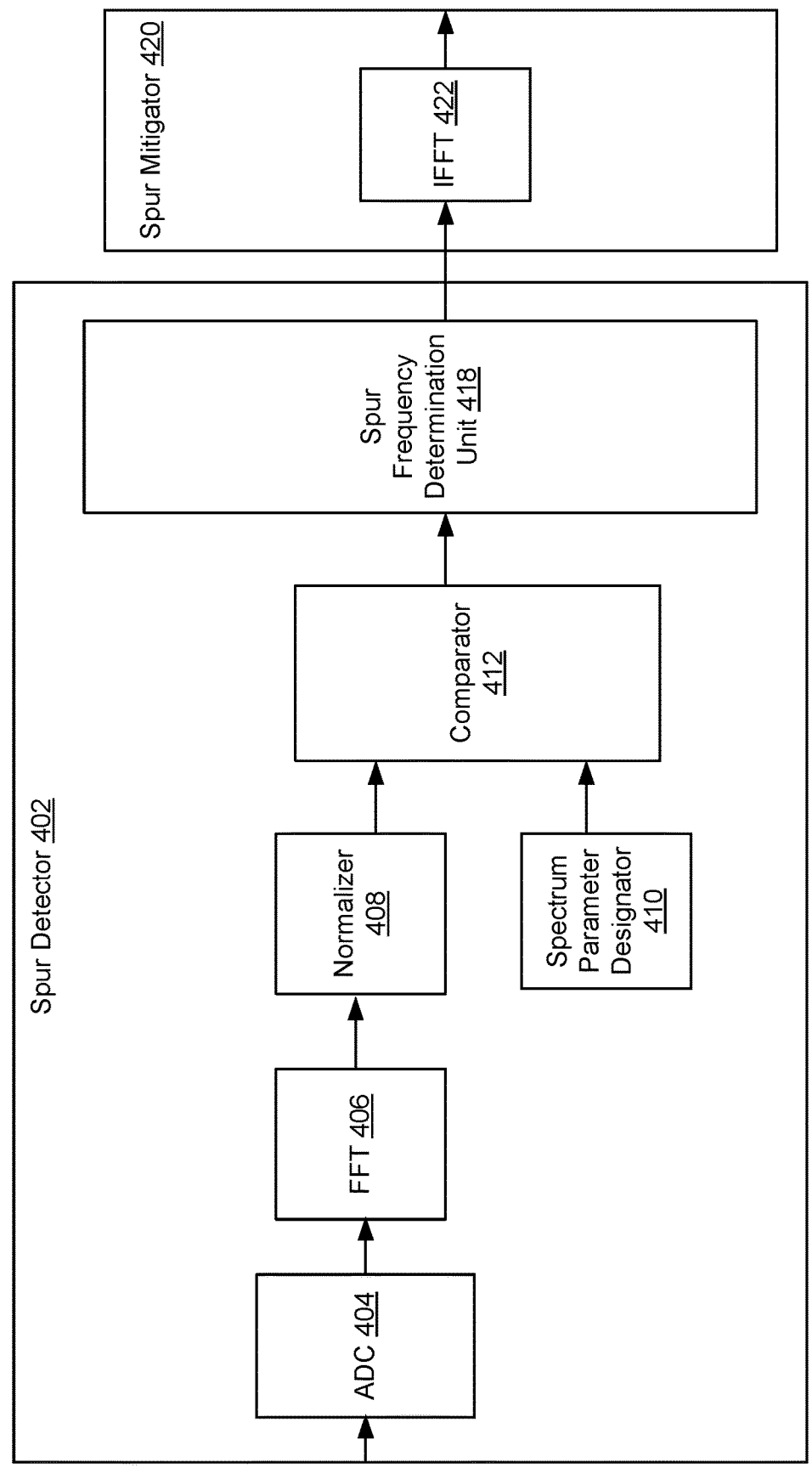
FIG. 4 illustrates a diagram of yet another example of a device for spur reduction and mitigation, configured in accordance with some embodiments.

FIG. 4 illustrates a diagram of yet another example of a device for spur reduction and mitigation, configured in accordance with some embodiments. As discussed above, devices disclosed herein, such as device 400, may include spur detectors and spur mitigators that are configured to identify and cancel band spur components present during data transmission. Accordingly, as will be discussed in greater detail below, a spur detector and spur mitigator may be configured to generate a cancelation signal to cancel such band spur components.

In various embodiments, device 400 includes spur detector 402, which includes various components configured to detect and identify spurs at different frequencies. As will be discussed in greater detail below, spur detector 402 may be configured to identify multiple different types of band spurs. Accordingly, spur detector 402 may include analog to digital converter 404 as well as fast Fourier transform (FFT) 406. In some embodiments, analog to digital converter 404 is configured to receive a signal from a receive path, which may be looped back from a transmit path. Moreover, analog to digital converter 404 is further configured to provide an output to FFT 406. In various embodiments, FFT 406 is configured to identify out of band components of the spectrum of the received signal. Accordingly, an output provided by FFT 406 may be identify out of band frequencies present in the received signal. In one example, FFT 406 is configured as a 256-point FFT. While FIG. 4 illustrates spur detector 402 as including ADC 404 and FFT 406, it will be appreciated that they may be implemented outside of spur detector 402, and FFT 406 may provide an output that is received at spur detector 402 as an input.

In various embodiments, spur detector 402 further includes normalizer 408 which is configured to normalize an output FFT 406 so that if may be compared against a reference spectrum, such as a reference spectrum stored in spectrum parameter designator 410. Accordingly, the normalization process may be implemented to account for and counteract changes that may have resulted in a gain and phase difference resulting from other components in the feedback path.

Once normalized, comparator 412 compares the output of normalizer 408 against the reference spectrum provided by spectrum parameter designator 410. In various embodiments, the reference spectrum is a spectrum that may be set by an entity, such as a user or administrator. Furthermore, the reference spectrum may have been determined based on a specification of a standard, such as an IEEE standard. Accordingly, the reference spectrum may be used as a basis of determining which frequencies have exceeded an acceptable magnitude of amplitude at particular frequencies and should be considered spur frequencies. Accordingly, comparator 412 is configured to compare the output of normalizer 408 and spectrum parameter designator 410 to determine if the normalized magnitude of the out of band frequencies exceeds a permissible amplitude designated by the reference spectrum.

In various embodiments, spur detector 402 also includes spur frequency determination unit 418 which is configured to store identifications of spur frequencies based on the results of comparator 412. Accordingly, in response to comparator 412 identifying that a particular out of band frequency has exceeded a permissible amplitude, as indicated by the reference spectrum, spur frequency determination unit 418 may identify that out of band frequency as a spur frequency and store the identification in memory. Similarly, if the particular out of band frequency has not exceeded a permissible amplitude, spur frequency determination unit 418 may identify that out of band frequency as not being a spur frequency, and store the identification in memory.

Device 400 further includes spur mitigator 420 that includes various components configured to generate a cancelation signal. In one example, spur mitigator 420 includes inverse fast Fourier transform (IFFT) 422 that is configured to generate a signal inverse to the one provided by spur frequency determination unit 418. More specifically, the out of band frequencies identified as spur frequencies may be fed to IFFT 422, and the output may be a cancelation signal. In this way, the output of spur mitigator 420 may be a cancelation signal that is configured to have an amplitude and phase that cancels the spur components identified by spur detector 402.

Figure 5:
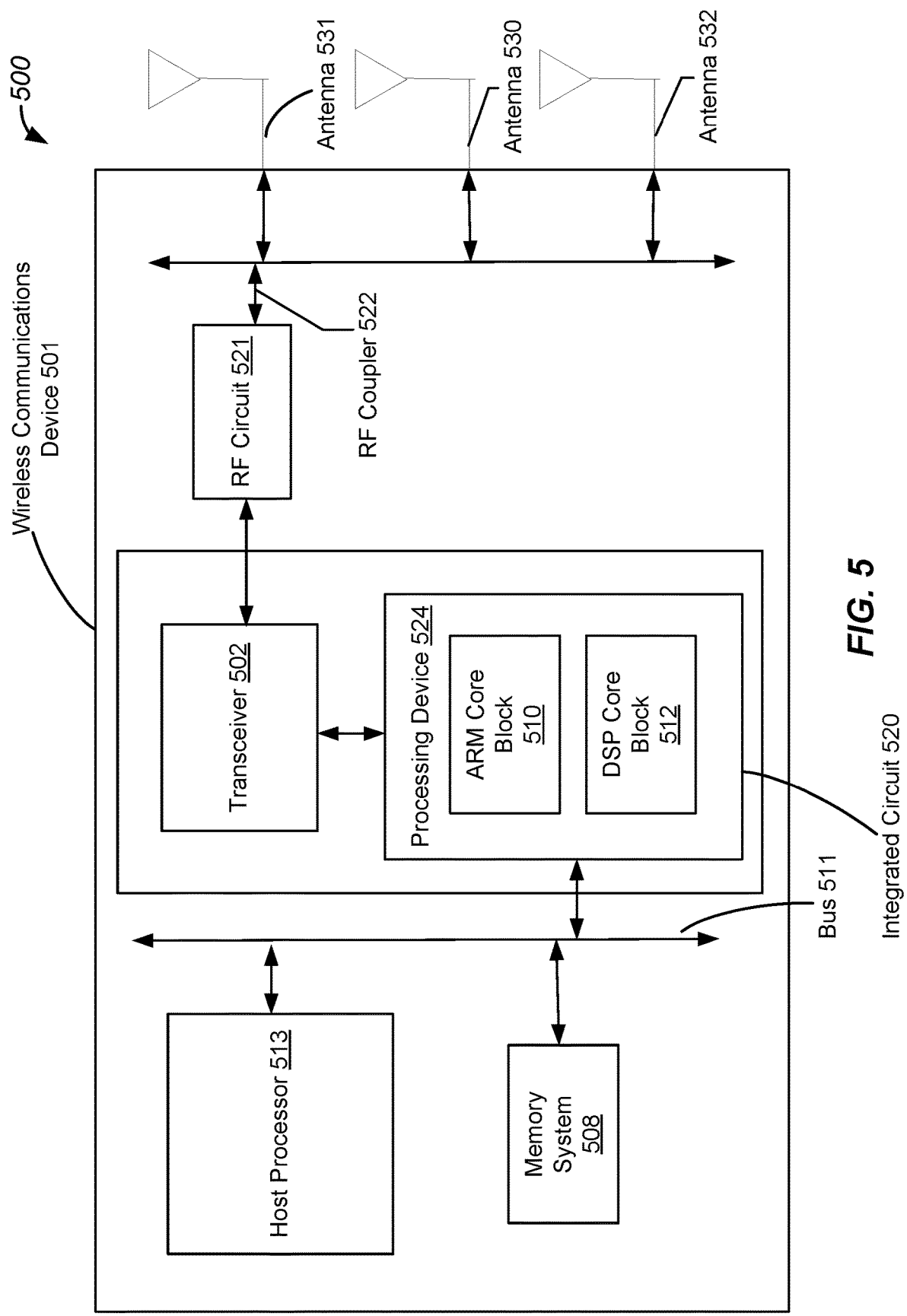
FIG. 5 illustrates a diagram of another example of a system for spur reduction and mitigation, configured in accordance with some embodiments.

FIG. 5 illustrates a diagram of another example of a system for spur reduction and mitigation, configured in accordance with some embodiments. More specifically, FIG. 5 illustrates an example of a system, such as system 500, that may include wireless communications device 501. It will be appreciated that wireless communications device 501 may be one of any of first devices 110 or second devices 120 discussed above. In various embodiments, wireless communications device 501 includes a transceiver, such as transceiver 502, which may be a transceiver such as transceivers 106 and 124 discussed above. In one example, system 500 includes transceiver 502 which is configured to transmit and receive signals using a communications medium that may include antenna 531. As noted above, transceiver 502 may be included in a Bluetooth radio, and may be compatible with a Bluetooth Low Energy communications protocol. In various embodiments, transceiver 502 may be compatible with another communications protocol, such as a WiFi protocol or a Zigbee protocol or any other suitable transmission protocol. Accordingly, transceiver 502 may include components, such as a modulator and demodulator as well as one or more buffers and filters, that are configured to generate and receive signals via antenna 531.

In various embodiments, system 500 further includes processing device 524 which may include logic implemented using one or more processor cores. Accordingly, processing device 524 is configured to a controller, as will be discussed in greater detail below. In various embodiments, processing device 524 includes one or more processing devices that are configured to implement the band spur mitigation and reduction that will be described in greater detail below. In various embodiments, processing device 524 includes one or more components configured to implement a medium access control (MAC) layer that is configured to control hardware associated with a wireless transmission medium, such as that associated with a Bluetooth transmission medium. In one example, processing device 524 may include processor core block 510 that may be configured to implement a driver, such as a Bluetooth driver. Processing device 524 may further include digital signal processor (DSP) core block 512 which may be configured to include microcode.

In various embodiments, processor core block 510 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack and a controller stack are implemented using at least processor core block 510. The host stack is configured to include layers for a Bluetooth network encapsulation protocol, radio frequency communication, service discovery protocol, as well as various other high-level data layers. The controller stack is configured to include a link management protocol, a host controller interface, a link layer which may be a low energy link layer, as well as various other timing critical layers.

System 500 further includes radio frequency (RF) circuit 521 which is coupled to one or more antennas, such as antenna 531, antenna 530, and antenna 532. In various embodiments, RF circuit 521 may include various components such as an RF switch, a diplexer, and a filter. Accordingly, RF circuit 521 may be configured to select an antenna for transmission/reception, and may be configured to provide coupling between the selected antenna, such as antenna 531, and other components of system 500 via a bus, such as bus 511. While FIG. 5 illustrates system 500 as having three antennas, it will be appreciated that system 500 may have a single antenna, or any suitable number of antennas.

System 500 includes memory system 508 which is configured to store one or more data values associated with the band spur mitigation and reduction discussed in greater detail below. Moreover, memory system 508 may be configured to store computer program code executable by one or more processors. Accordingly, memory system 508 includes storage device, which may be a non-volatile random-access memory (NVRAM) configured to store such data values, and may also include a cache that is configured to provide a local cache. In various embodiments, system 500 further includes host processor 513 which is configured to implement processing operations implemented by system 500.

It will be appreciated that one or more of the above-described components may be implemented on a single chip, or on different chips. For example, transceiver 502 and processing device 524 may be implemented on the same integrated circuit chip, such as integrated circuit chip 520. In another example, transceiver 502 and processing device 524 may each be implemented on their own chip, and thus may be disposed separately as a multi-chip module or on a common substrate such as a printed circuit board (PCB). It will also be appreciated that components of system 500 may be implemented in the context of a low energy device, a smart device, or a vehicle such as an automobile. Accordingly, some components, such as integrated chip 520, may be implemented in a first location, while other components, such as antenna 531, may be implemented in second location, and coupling between the two may be implemented via a coupler such as RF coupler 522.

Figure 6:
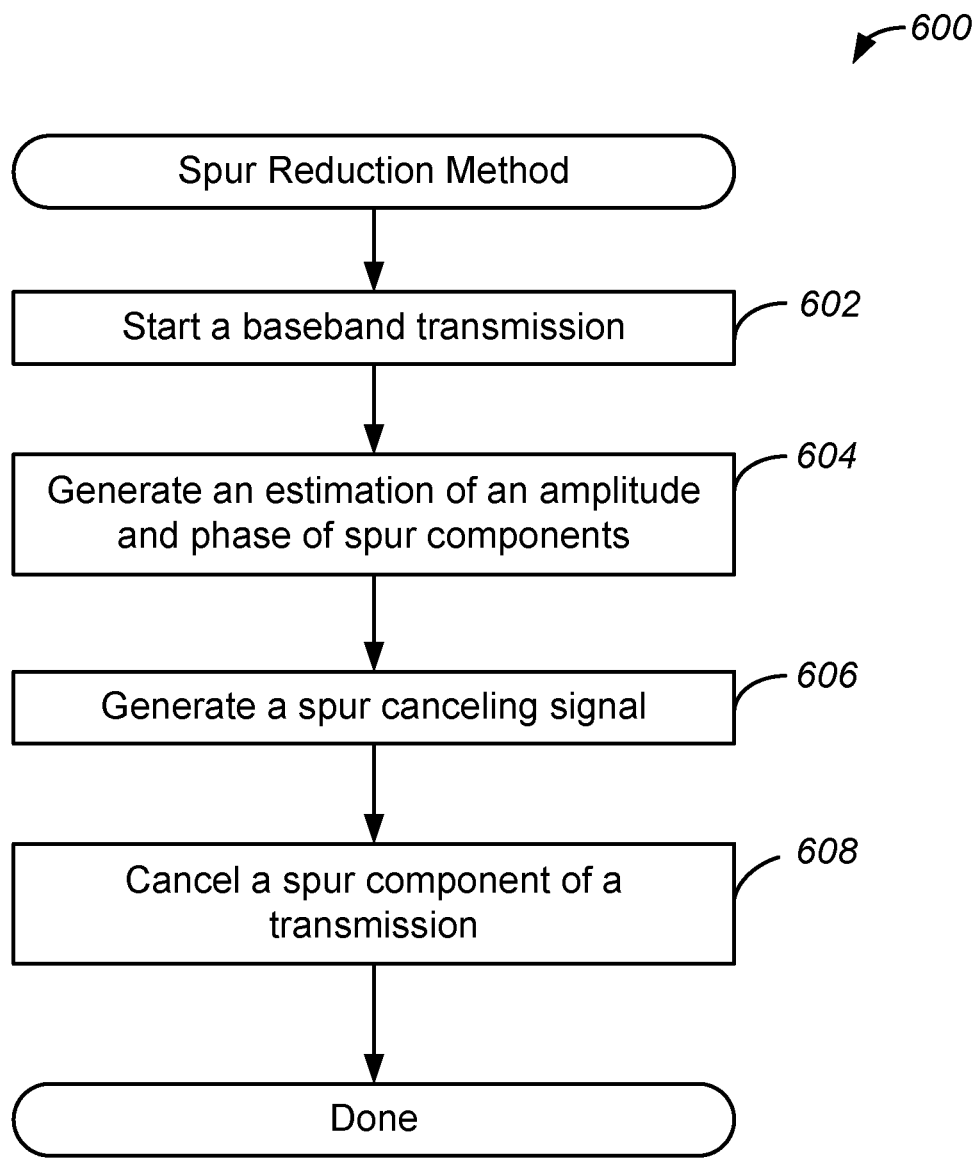
FIG. 6 illustrates a flow chart of an example of a method for spur reduction and mitigation, implemented in accordance with some embodiments.

FIG. 6 illustrates a flow chart of an example of a method for spur reduction and mitigation, implemented in accordance with some embodiments. As discussed above, band spurs may occur that affect a waveform and transmission power usage of a wireless communications device. In various embodiments, a method, such as method 600 may be used to estimate aspects of the spur components, and generate a canceling signal based on the estimates. In this way, the band spurs may be reduced when data is transmitted.

Accordingly, method 600 may commence with operation 602 during which a transmission may be started. As discussed above, the transmission may be a baseband transmission that is transmitted using a physical layer of a wireless communications device. In some embodiments, the physical layer is part of a Bluetooth stack. As also discussed above, aspects of the baseband layer may affect the waveform of the transmitted signal, and may cause spurs at some frequencies.

Method 600 may proceed to operation 604 during which an estimation of an amplitude and phase of spur frequencies may be generated. Accordingly, components of the wireless communications device may estimate various aspects and parameters of the band spurs, such as the spur frequencies as well as an amplitude and phase of spur components at such frequencies. Additional details regarding the estimation of such spur components and usage of the estimations are discussed in greater detail below with reference to at least FIGS. 7-13.

Method 600 may proceed to operation 606 during which a spur canceling signal may be generated. Accordingly, the estimates of amplitude and phase of spur frequencies may be used to generate a canceling signal that is configured to oppose the estimated components. For example, the canceling signal may have aspects that are opposite or the inverse of the estimated amplitude and phase at the identified spur frequencies. In this way, the canceling signal is configured to actively cancel the band spurs at the identified frequencies.

Method 600 may proceed to operation 608 during which a spur component of the transmission may be canceled. Accordingly, the canceling signal may be combined with a transmitted signal for transmitted data such that when a transmission occurs, the canceling signal is incorporated and cancels spur components of the transmitted signal. In this way, band spur components of the transmitted signal may be canceled using the estimates of the band spur components described above.

Figure 7:
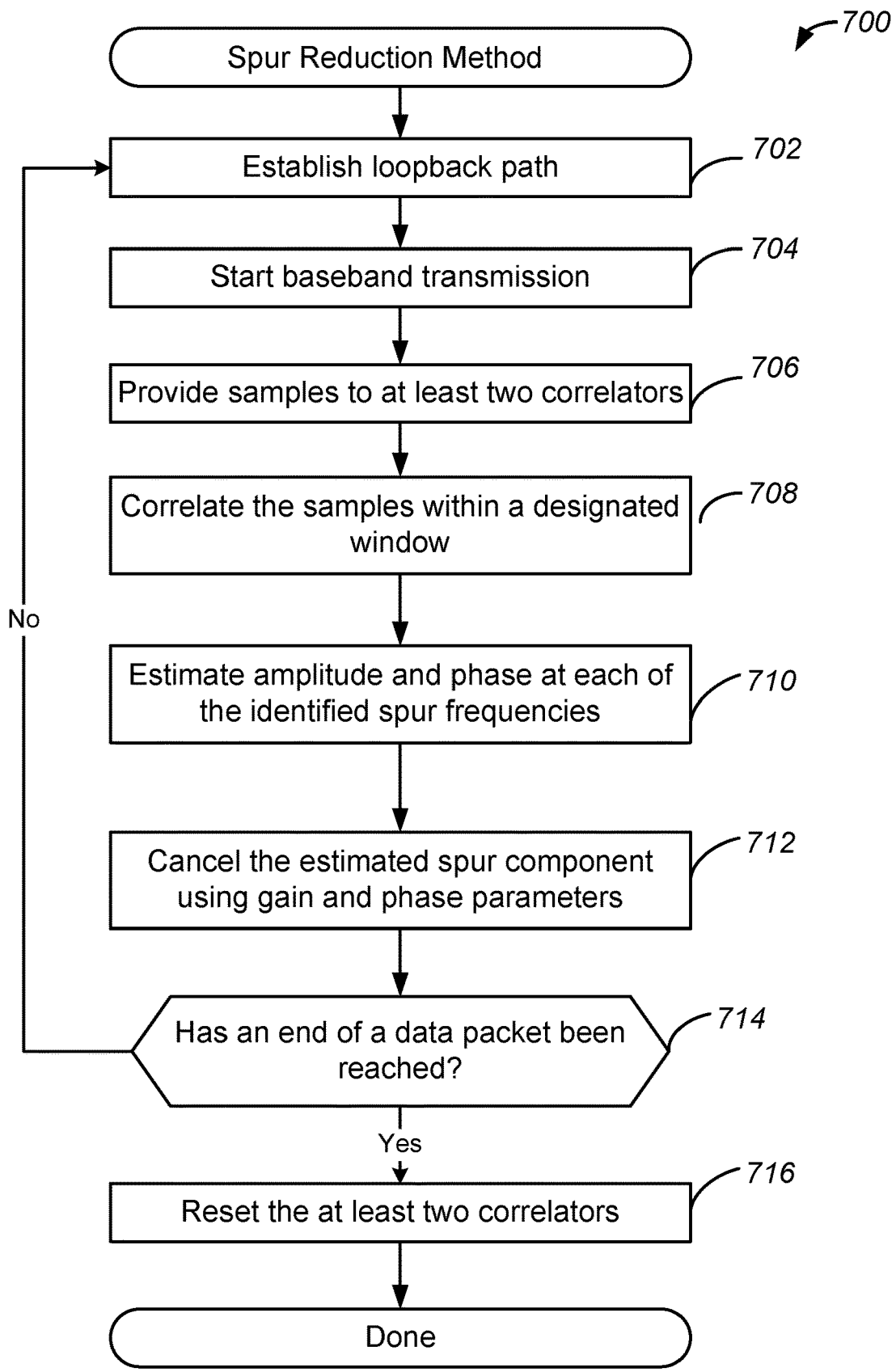
FIG. 7 illustrates a flow chart of another example of a method for spur reduction and mitigation, implemented in accordance with some embodiments.

FIG. 7 illustrates a flow chart of another example of a method for spur reduction and mitigation, implemented in accordance with some embodiments. As discussed above, band spurs may occur that affect a waveform and transmission power usage of a wireless communications device. In various embodiments, a method, such as method 700, may utilize one or more correlators to estimate aspects of the spur components, and generate a canceling signal based on the estimates. In various embodiments, any number of correlators may be implemented to cancel any number of band spurs.

Accordingly, method 700 may commence with operation 702 during which a loopback path may be established. As discussed above, a communicative pathway may exist between a transmit path and a receive path. Such a path may be implemented prior to a point of coupling with one or more antennas such that the loopback path provides an output of a transmit chain to an input of a receive chain without passing through the transmit or receive antennas. In some embodiments, the loopback path may be established using an RF coupler, as discussed above, or another available loopback path. Moreover, in various embodiments, an analog-to-digital converter may be configured to have an appropriate dynamic range.

Method 700 may proceed to operation 704 during which a baseband transmission may be started. As also discussed above, the baseband transmission may be a transmission that comes from a physical layer of a wireless communications device. In various embodiments, the baseband transmission is a test or reference data pattern that is configured to provide an accurate representation of the spur components cause, at least in part, by the baseband layer. In some embodiments, the transmission is an arbitrary data pattern or waveform.

Method 700 may proceed to operation 706 during which a plurality of samples may be provided to at least two correlators. Accordingly, the baseband transmission may be transmitted, looped back along the receive path, and samples from the receive path are provided to at least two correlators. In this way, the baseband transmission is fed through the transmit chain and the receive chain, and then sampled to enable the generation of a canceling signal, as will be discussed in greater detail below.

Method 700 may proceed to operation 708 during which the samples may be correlated within a designated window. Accordingly, the received samples may be partitioned or chunked into sections or blocks, and each one may be processed by the correlators in sequence. In another example, a moving window may be implemented to correlate received samples in successive windows. As discussed above with reference to FIG. 3, the at least two correlators are configured to correlate the received samples to reference waveforms based on one or more equations. Accordingly, during operation 708, each implemented correlator may correlate the samples with a reference waveform, which may be a generated sinusoid, as discussed above.

Method 700 may proceed to operation 710 during which an estimated amplitude and phase may be generated at each of the identified spur frequencies. As similarly discussed above, the correlators are configured to estimate a magnitude and phase at a spur frequency based on the correlation. In one example, based on the equations previously discussed, each implemented correlator may output an estimated amplitude and phase at a spur frequency designated by the reference waveform. As also discussed above, any number of correlators may be implemented and each correlator may generate an estimated amplitude and phase at a particular spur frequency.

Method 700 may proceed to operation 712 during which estimated spur components may be canceled based on gain and phase parameters. Accordingly, various gain and phase parameters may be determined that counteract or cancel the estimated components discussed above. In some embodiments, the gain and phase parameters may be the opposite or inverse of the estimated amplitude and phase at each of the identified spur frequencies. As discussed above, such gain and phase parameters may be fed to a signal generator which generates a canceling signal that is combined with the transmitted signal in the transmit path. In this way, the canceling signal is generated and used to actively cancel spur components of the transmitted signal.

Method 700 may proceed to operation 714 during which it may be determined if the end of a data packet has been reached. Such a determination may be made based on a stored index or flag that may be used to keep track of which window or partition of the received data is being processed. In this way, one or more data values may determine if additional partitions or windows remain or not. If it is determined that the end of the data packet has not been reached, method 700 may return to operation 702. If it is determined that the end of the data packet has been received, method 700 may proceed to operation 716.

Accordingly, during operation 716, the at least two correlators may be reset. Accordingly, data and memory locations used by the at least two correlators may be cleared and they may be reset such that they are ready for the implementation of additional correlation operations when the next data packet is to be transmitted. Moreover, other components may be reset as well. For example, gain and phase offsets as well as the spur canceling signal generator may be reset during operation 716 as well.

Figure 8:
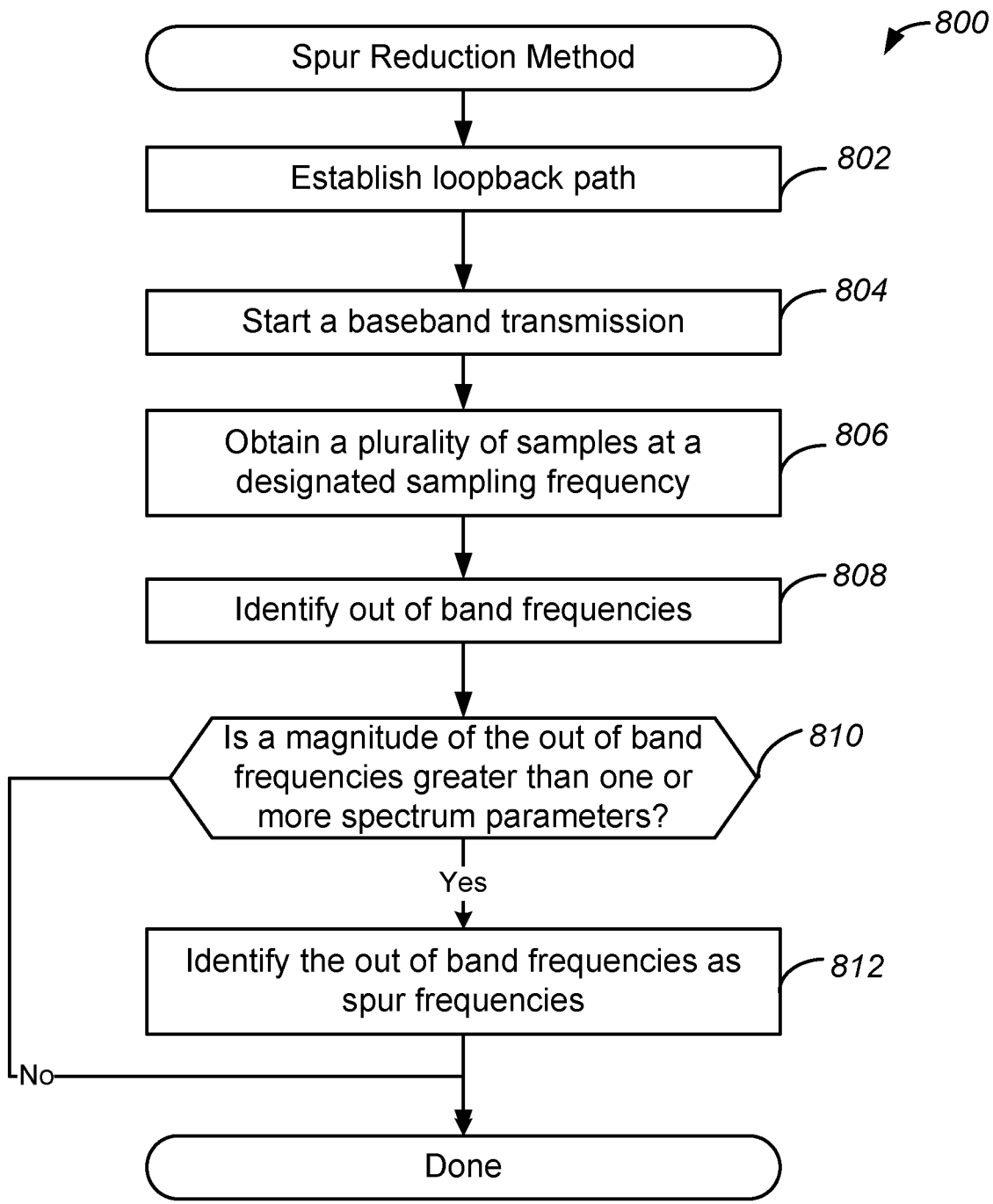
FIG. 8 illustrates a flow chart of yet another example of a method for spur reduction and mitigation, implemented in accordance with some embodiments.

FIG. 8 illustrates a flow chart of yet another example of a method for spur reduction and mitigation, implemented in accordance with some embodiments. As will be discussed in greater detail below, a method, such as method 800, may be implemented to detect one or more components of band spurs. Accordingly, method 800 may be implemented to detect and identify spurs components that occur at different frequencies. The results of method 800 may subsequently be used to mitigate and cancel the spur components.

Accordingly, method 800 may commence with operation 802 during which a loopback path may be established. As discussed above, a communicative pathway may exist between a transmit path and a receive path. Such a path may be implemented prior to a point of coupling with one or more antennas such that the loopback path provides an output of a transmit chain to an input of a receive chain without passing through the transmit or receive antennas. In some embodiments, the loopback path may be established using an RF coupler, as discussed above, or another available loopback path. Moreover, in various embodiments, an analog-to-digital converter may be configured to have an appropriate dynamic range.

Method 800 may proceed to operation 804 during which a baseband transmission may be started. As also discussed above, the baseband transmission is a transmission that comes from a physical layer of a wireless communications device. In various embodiments, the baseband transmission is a test or reference data pattern that is configured to provide an accurate representation of the spur components cause, at least in part, by the baseband layer. In some embodiments, the transmission is an arbitrary data pattern or waveform.

Method 800 may proceed to operation 806 during which a plurality of samples is obtained at a designated sampling frequency. Accordingly, a number of samples may be obtained in the receive path at a designated sampling frequency. The samples may be made by one or more components of a spur detector, as similarly discussed above with reference to at least FIG. 4. In some embodiments, a Farrow rate converter is configured to determined the sampling rate. For example, the sampling rate may be 80 MHz.

Method 800 may proceed to operation 808 during which out of band frequencies may be identified. Accordingly, the obtained samples may be passed through a fast Fourier transform, and the resulting computed spectrum may be compared against one or more reference values identifying frequencies included in a frequency band. For example, a transmission protocol, such as a Bluetooth protocol, may specify a range of frequencies included in a transmission band, and the wireless communications device may have such a specified range stored in memory as part of ordinary data transmission operations. During operation 808, the output of the computed spectrum of frequencies may be compared against the reference values to identify frequency components of the samples that fall outside of the range of frequencies permitted by the transmission protocol. Such identified frequencies are also referred to as out of band frequencies.

Method 800 may proceed to operation 810 during which it may be determined if a magnitude of the out of band frequencies is greater than one or more spectrum parameters. As similarly discussed above with reference to FIG. 4, a magnitude of the identified out of band frequencies may be compared with one or more spectrum parameters that may have been designated by an entity, such as a user or administrator, or a standard, such as an IEEE standard. As also discussed above, such spectrum parameters are configured to identify a maximum acceptable magnitude of amplitude for various frequencies. Accordingly, during operation 810, it may be determined if any of the sampled frequencies have a magnitude that exceeds the maximum acceptable magnitudes identified by the spectrum parameters. If it is determined that the magnitude is not greater for any of the sampled frequencies, method 800 may terminate. If it is determined that the magnitude is greater for one or more sampled frequencies, method 800 may proceed to operation 812.

Accordingly, during operation 812, one or more out of band frequencies may be identified as spur frequencies. As discussed above, one or more data values, such as a flag, may be stored, as well as various frequency parameters of the identified out of band frequency. In this way, the data values stored during operation 812 may identify all spur frequencies that were identified based on the sampled data received from the baseband transmission of operation 804.

Figure 9:
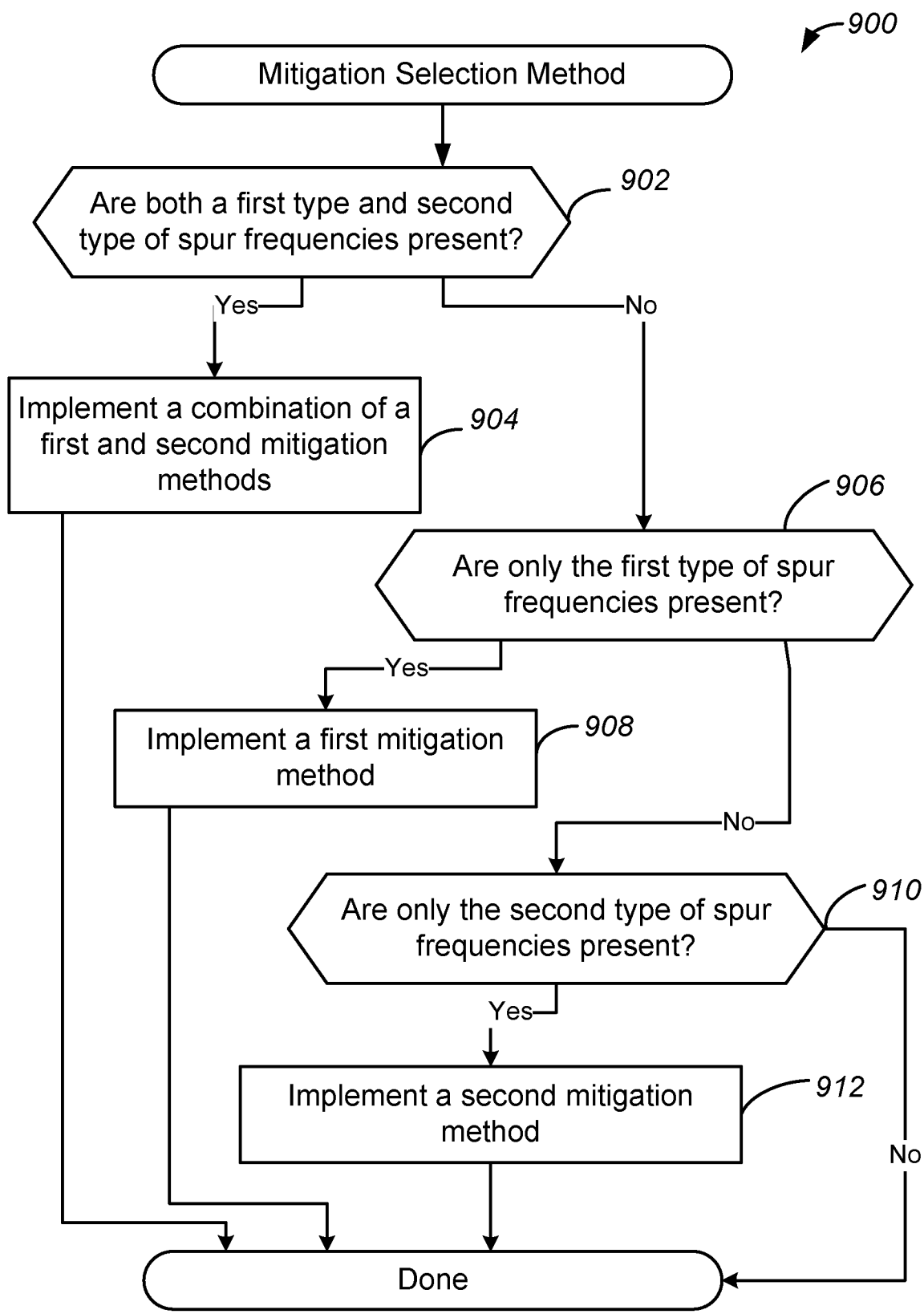
FIG. 9 illustrates a flow chart of an example of a method for mitigation selection, implemented in accordance with some embodiments.

FIG. 9 illustrates a flow chart of an example of a method for mitigation selection, implemented in accordance with some embodiments. As discussed above, spur components may first be detected and identified, and then they may subsequently be reduced and mitigated. Accordingly, a method, such as method 900, may be implemented to identify a type of mitigation and reduction to be applied in order to reduce such spur components that occur at spur frequencies.

Accordingly, method 900 may commence with operation 902 during which it may be determined if both a first type and a second type of spur frequencies are present. In various embodiments, such a determination may be made based on the frequencies of such spur frequencies. For example, the first type of spur frequency may be outside of a transmission band and outside a designated frequency range of an edge frequency of the transmission band. In various embodiments, the edge frequency is a frequency that defines a boundary of the frequencies of the transmission band. In one example, the edge frequency may be determined based on a transmission protocol parameter, as may be specified by a transmission protocol specification. Moreover, the second type of spur frequency may be outside of a transmission band and within the designated frequency range of an edge frequency of the transmission band. Moreover, the second type of spur frequency may be outside of a transmission band and within the designated frequency range of an edge frequency of the transmission band. Accordingly, the frequencies of spur frequencies, as may have been identified during, for example, method 800, may be used to identify whether or not they are a first type or second type of spur frequencies, and thus, whether or not the first type of spur frequencies are present and whether or not the second type of spur frequencies are present.

If it is determined that both the first and second types of spur frequencies are present, method 900 may proceed to operation 904 during which a combination of a first mitigation method and a second mitigation may be implemented. Accordingly, a combination of different mitigation modalities may be configured and implemented to mitigate and reduce the first type of spur frequencies and the second type of spur frequencies. Additional details of the first mitigation method are provided below with reference to FIGS. 10 and 11. Moreover, additional details of the second mitigation method are provided below with reference to FIGS. 12 and 13.

Returning to operation 902, if it is determined that the sampled transmission does not have both the first and second types of spur frequencies, method 900 may proceed to operation 906 during which it may be determined if only the first type of spur frequencies are present. As discussed above, such a determination may be made based, at least in part, on the frequencies of the identified spur frequencies and a comparison with a designated frequency range of an edge frequency of a transmission band. Accordingly, if it is determined that only the first type of spur frequencies are present, method 900 may proceed to operation 908 during which the first mitigation method may be applied. Accordingly, during operation 908, the first mitigation method may be implemented to mitigate and reduce the first type of spur frequency, as will be discussed in greater detail below with reference to FIGS. 10 and 11.

If it is determined that the first type of spur frequencies are not present, method 900 may proceed to operation 910 during which it is determined if only the second type of spur frequencies is present. As similarly discussed above, such a determination may be made based, at least in part, on the frequencies of the identified spur frequencies and a comparison with a designated frequency range of an edge frequency of a transmission band. Accordingly, if it is determined that only the second type of spur frequencies are present, method 900 may proceed to operation 912 during which the second mitigation method may be applied. Accordingly, during operation 912, the second mitigation method may be implemented to mitigate and reduce the second type of spur frequency, as will be discussed in greater detail below with reference to FIGS. 12 and 13. If it is determined that the second type of spur frequencies are not present, method 900 may terminate.

Figure 10:
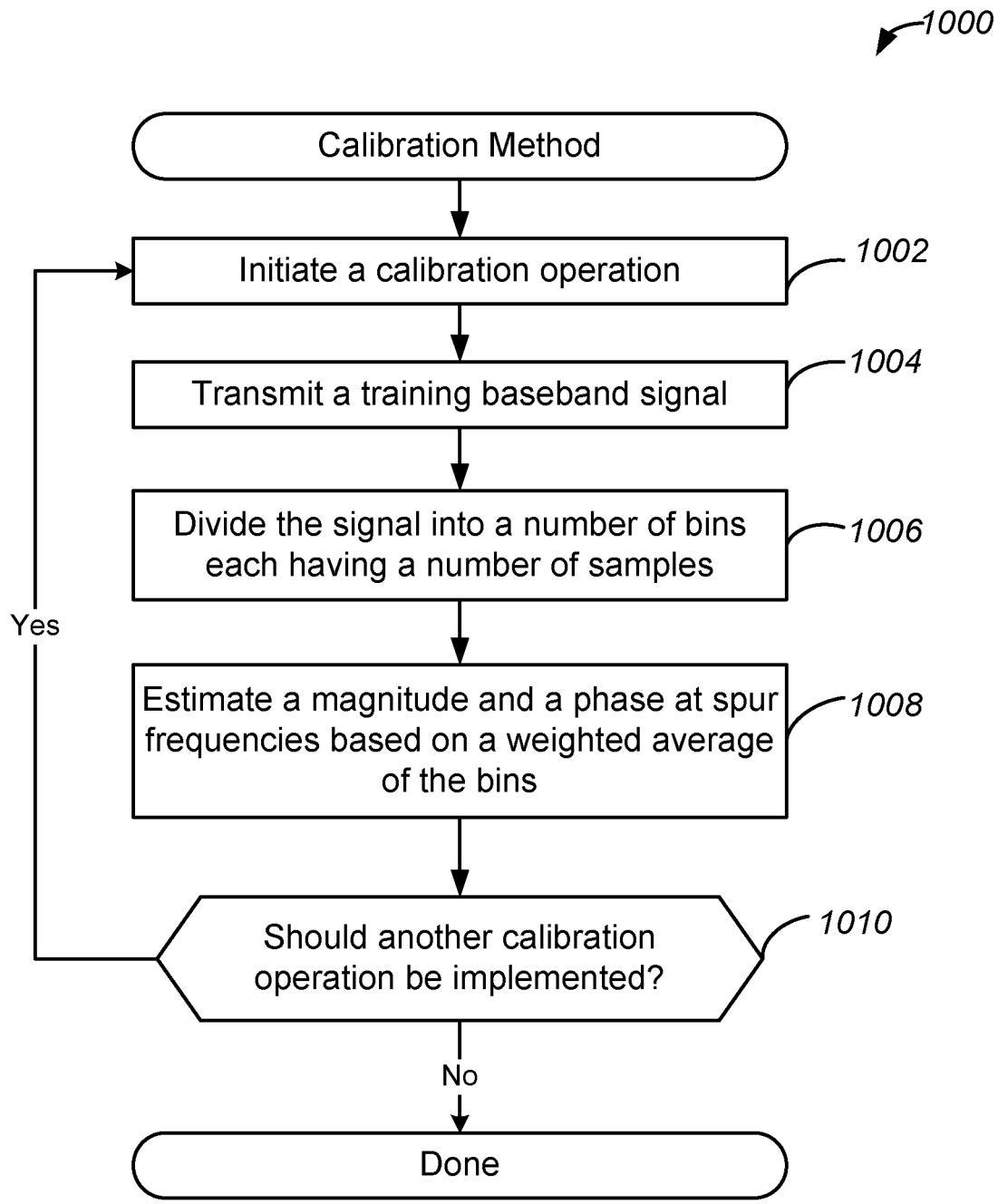
FIG. 10 illustrates a flow chart of an example of a method for calibration, implemented in accordance with some embodiments.

FIG. 10 illustrates a flow chart of an example of a method for calibration, implemented in accordance with some embodiments. As discussed above, various methods may be implemented to mitigate and reduce spur components. In various embodiments, a method, such as method 1000, may be implemented to calibrate one or more components of a wireless communications device prior to mitigation methods. More specifically, method 1000 may be implemented prior to mitigation and compensation operations for the first type of spur components discussed above.

Accordingly, method 1000 may commence with operation 1002 during which a calibration operation may be initiated. In various embodiments, the calibration operation may be implemented periodically, or may be triggered by one or more designated conditions. For example, a temperature change, a voltage change, or some external trigger may cause the implementation of a calibration operation. In various embodiments, a calibration operation may also be implemented responsive to one or more system events, such as the determination that a data packet is to be transmitted.

Method 1000 may proceed to operation 1004 during which a training baseband signal may be transmitted. As similarly discussed above, the baseband transmission is a transmission that comes from a physical layer of a wireless communications device. In various embodiments, the transmitted baseband signal is a training signal or data pattern that includes an arbitrary data pattern or waveform.

Method 1000 may proceed to operation 1006 during which the training baseband signal is sampled and divided into a number of bins. Accordingly, as similarly discussed above, the signal may be sampled along the receive path at a designated sampling frequency, and the samples may be portions and stored in bins. In one example, each bin is configured to store 256 samples.

Method 1000 may proceed to operation 1008 during which a magnitude and phase may be estimated at spur frequencies based on a weighted average of the bins. Accordingly, spur frequencies may be identified and magnitudes and phases may be estimated at such frequencies based on the techniques discussed above with reference to at least FIGS. 7 and 8. As also discussed above, the spur frequencies may be the first type of spur frequencies. However, according to various embodiments, weighted averages may be computed for each bin prior to the identification of such magnitudes and phases. In various embodiments, weighted averaging is implemented to improve the estimate of the magnitude and phase. For example, there may be some error in the magnitude/phase that is observed from one bin to other. In various embodiments, weights are adaptively updated based on observations of how error is varying from one bin to other. In some embodiments, the weight converges on a final weight when the error falls below a designated.

Method 1000 may proceed to operation 1010 during which it may be determined if another calibration operation should be implemented. In various embodiments, such a determination may be made based on whether or not another designated condition or triggering event has occurred. Accordingly, if another designated condition or triggering event has occurred, method 1000 may return to operation 1002. If no such designated condition or triggering event has occurred, method 1000 may terminate. In various embodiments, method 1000 may proceed to a waiting or standby state, and may wait for a triggering event.

Figure 11:
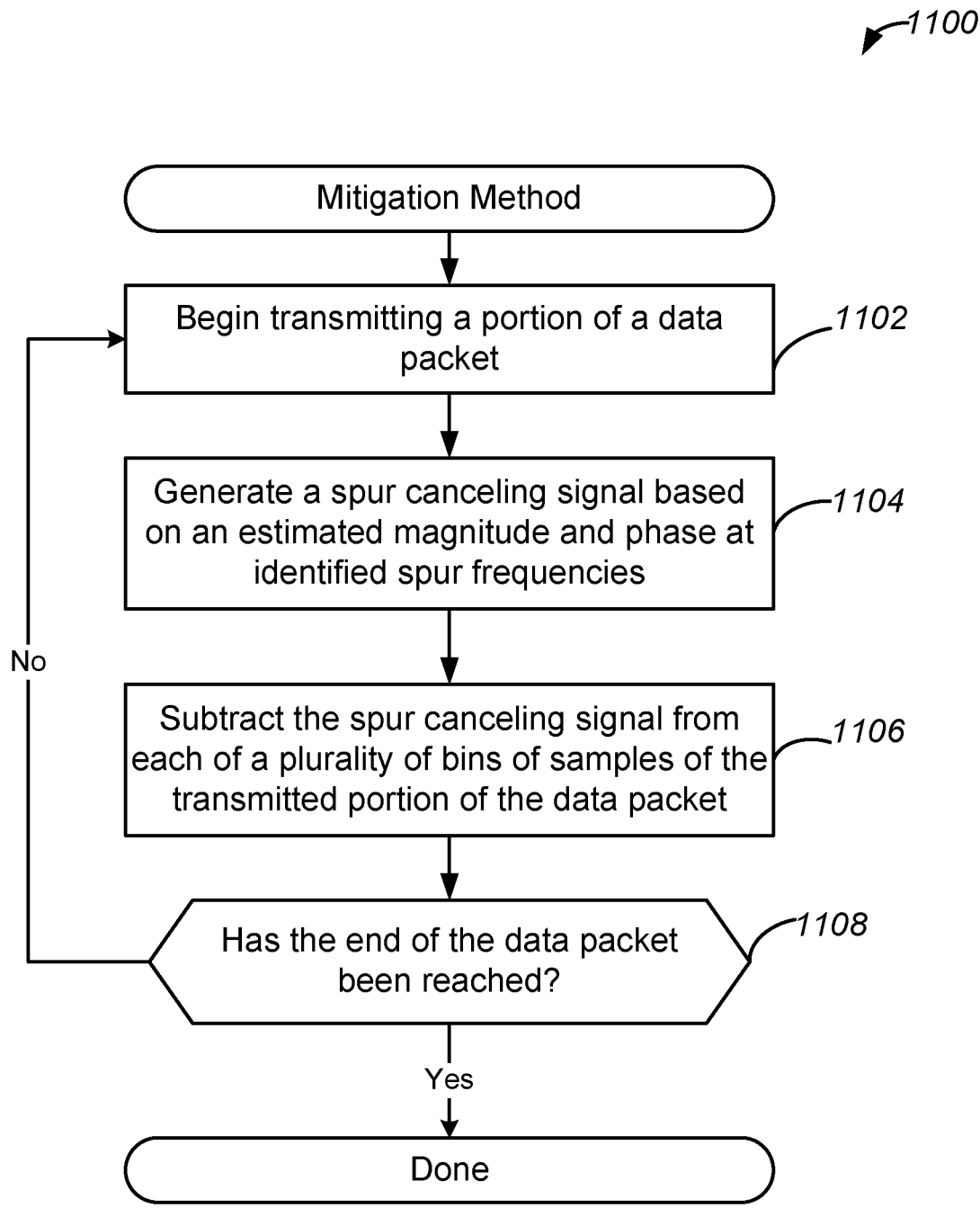
FIG. 11 illustrates a flow chart of an example of a method for compensation, implemented in accordance with some embodiments.

FIG. 11 illustrates a flow chart of an example of a method for compensation, implemented in accordance with some embodiments. As discussed above, various methods may be implemented to mitigate and reduce spur components. In various embodiments, a method, such as method 1100, may be implemented to generate a canceling signal and apply the canceling signal during transmission of data. More specifically, method 1100 may be implemented to mitigate and reduce the first type of spur components discussed above.

Accordingly, method 1100 may commence with operation 1102 during which transmission of a portion of a data packet may begin. Accordingly, a wireless communications device may begin transmission of data values using one or more components of a transmit path, as described above. As also discussed above, the data packet may have been divided or portioned into bins. Accordingly, during operation 1102, transmission of a bin may begin.

Method 1100 may proceed to operation 1104 during which a spur canceling signal may be generated based on estimated magnitudes and phases at identified spur frequencies. As discussed above, a spur canceling signal may be configured to oppose the estimated magnitudes and phases at the identified spur frequencies, which may be the first type of spur frequencies. For example, an IFFT may be configured to generate the canceling signal based on magnitude and phase offsets that are opposite to the estimated magnitudes and phases.

Method 1100 may proceed to operation 1106 during which the spur canceling signal may be subtracted from the transmitted data packet. Accordingly, the spur canceling signal may be subtracted from the transmitted portion of the data packet using a component, such as a combiner, and the portion of the data packet may be transmitted with the spur components mitigated and compensated for. In this way, the first type of spur components may be mitigated and reduced.

Method 1100 may proceed to operation 1108 during which it may be determined if the end of a data packet has been reached. In various embodiments, such a determination may be made based on an index or flag that may be used to keep track of a number of bins. Thus, in one example, an index may be checked, and it may be determined if any bins remain. If it is determined that bins remain, and the end of the data packet has not been reached, method 1100 may return to operation 1102. If it is determined that the end of the data packet has been reached, and no bins remain, method 1100 may terminate.

Figure 12:
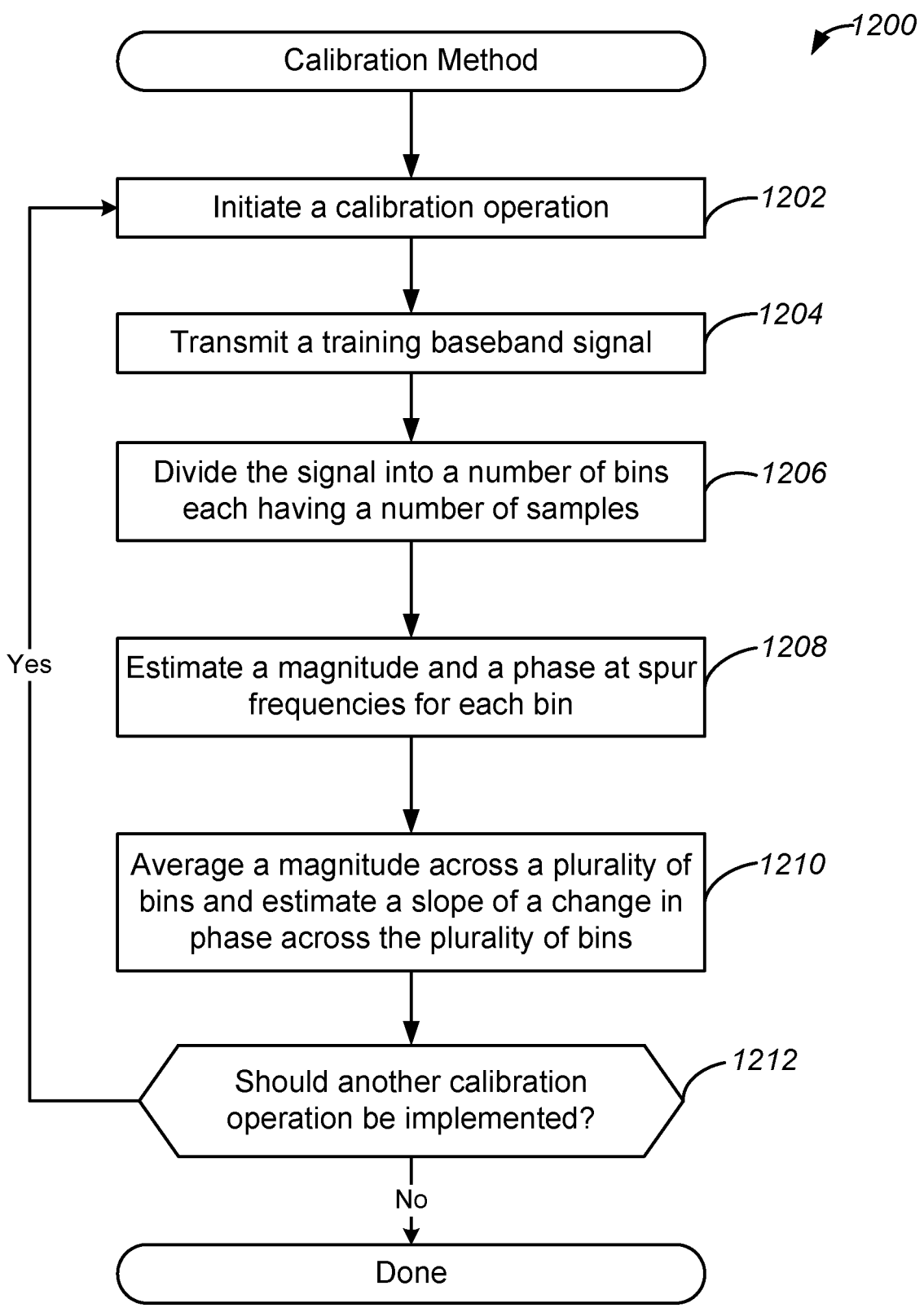
FIG. 12 illustrates a flow chart of another example of a method for calibration, implemented in accordance with some embodiments.

FIG. 12 illustrates a flow chart of another example of a method for calibration, implemented in accordance with some embodiments. As discussed above, various methods may be implemented to mitigate and reduce spur components. In various embodiments, a method, such as method 1200, may be implemented to calibrate one or more components of a wireless communications device prior to mitigation methods. More specifically, method 1200 may be implemented prior to mitigation and compensation operations for the second type of spur components discussed above.

Accordingly, method 1200 may commence with operation 1202 during which a calibration operation may be initiated. In various embodiments, the calibration operation may be implemented periodically, or may be triggered by one or more designated conditions. For example, a temperature change, a voltage change, or some external trigger may cause the implementation of a calibration operation. In various embodiments, a calibration operation may also be implemented responsive to one or more system events, such as the determination that a data packet is to be transmitted.

Method 1200 may proceed to operation 1204 during which a training baseband signal may be transmitted. As similarly discussed above, the baseband transmission is a transmission that comes from a physical layer of a wireless communications device. In various embodiments, the transmitted baseband signal is a training signal or data pattern that includes an arbitrary data pattern or waveform.

Method 1200 may proceed to operation 1206 during which the training baseband signal may be divided into a number of bins each having a number of samples. Accordingly, as similarly discussed above, the signal may be sampled along the receive path at a designated sampling frequency, and the samples may be portions and stored in bins. In one example, each bin is configured to store 256 samples Method 1200 may proceed to operation 1208 during which a magnitude and phase may be estimated at spur frequencies for each bin. Accordingly, as discussed above, spur frequencies may be identified and magnitudes and phases may be estimated at such frequencies based on the techniques discussed above with reference to at least FIGS. 7 and 8. Moreover, such spur frequencies may be the second type of spur frequencies discussed above.

Method 1200 may proceed to operation 1210 during which a magnitude may be averaged across a plurality of bins, and a slope of a change in phase may be estimated across the plurality of bins. Accordingly, during operation 1210, an estimated magnitude may be averaged across all bins. Moreover, an increase in phase from one bin to another may be computed across all bins. For example, it may be observed that the phase of a second type of spur frequencies, which may be closer to the edge frequencies of the transmission band, is not constant, and gradually changes from one bin to the other bin. In various embodiments, the variation is modelled as a linear variation, and the variation of the phase is estimated by estimating the slope during the calibration process. Accordingly, once the average phase of the current bin is computed, the phase of the next bin can be computed by adding the phase of the current bin with an additional amount determined based on the slope estimated during the calibration process.

Method 1200 may proceed to operation 1212 during which it may be determined if another calibration operation should be implemented. In various embodiments, such a determination may be made based on whether or not another designated condition or triggering event has occurred. Accordingly, if another designated condition or triggering event has occurred, method 1200 may return to operation 1202. If no such designated condition or triggering event has occurred, method 1200 may terminate. In various embodiments, method 1200 may proceed to a waiting or standby state, and may wait for a triggering event.

Figure 13:
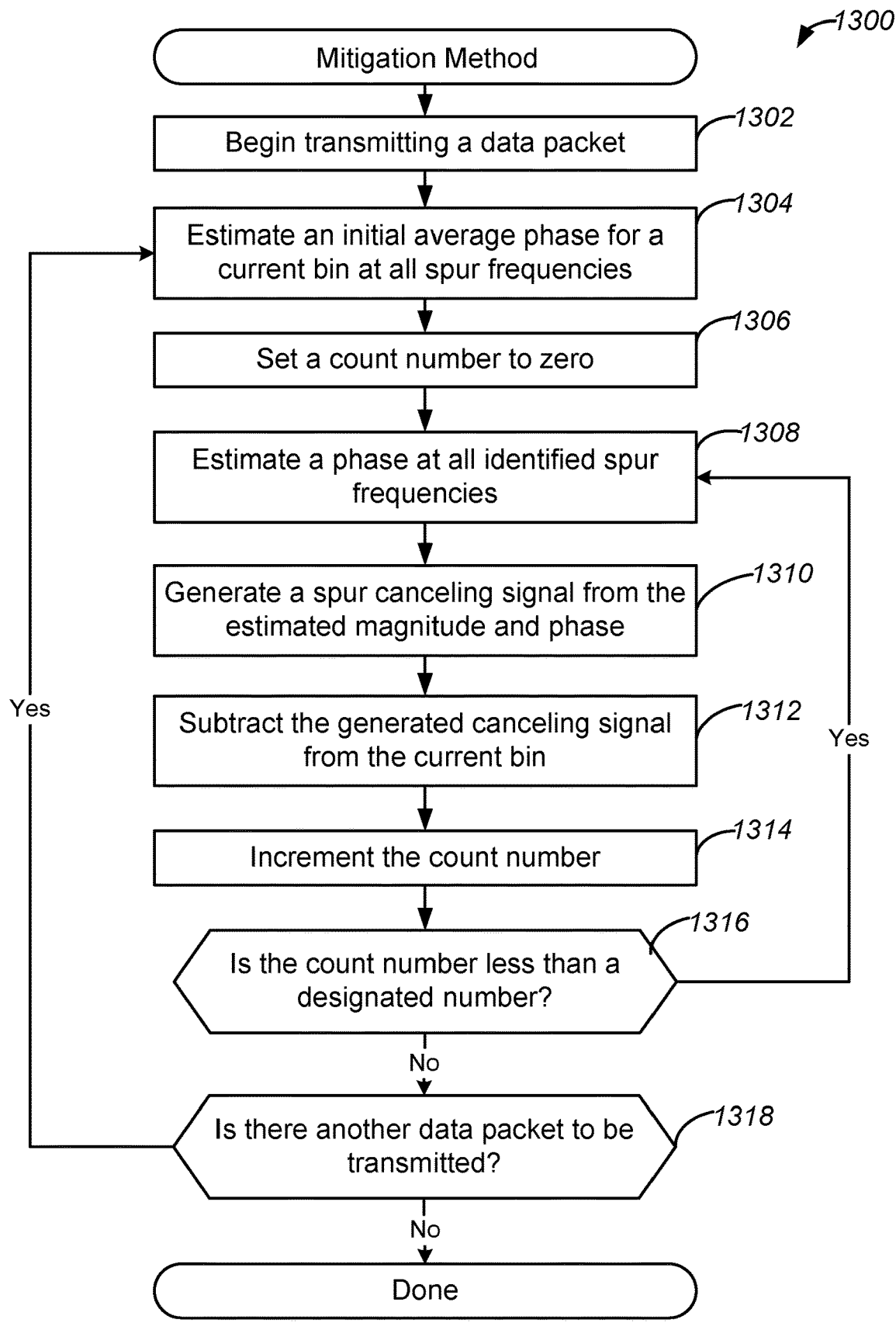
FIG. 13 illustrates a flow chart of yet another example of a method for calibration, implemented in accordance with some embodiments.

FIG. 13 illustrates a flow chart of yet another example of a method for calibration, implemented in accordance with some embodiments. As discussed above, various methods may be implemented to mitigate and reduce spur components. In various embodiments, a method, such as method 1300, may be implemented to generate a canceling signal and apply the canceling signal during transmission of data. More specifically, method 1300 may be implemented to mitigate and reduce the second type of spur components discussed above.

Accordingly, method 1300 may commence with operation 1302 during which transmission of a portion of a data packet may begin. Accordingly, a wireless communications device may begin transmission of data values using one or more components of a transmit path, as described above. As also discussed above, the data packet may have been divided or portioned into bins. Accordingly, during operation 1302, transmission of a bin may begin.

Method 1300 may proceed to operation 1304 during which an initial average phase may be estimated for a current bin at all identified spur frequencies. As discussed above, the spur frequencies may be a first type of spur frequency. Accordingly, during operation 1304, an average phase may be calculated for an initial bin. As noted above, bins may be identified and indexed using one or more numbers or flags, and the initial bin may be the first of a plurality of bins.

Method 1300 may proceed to operation 1306 during which a count number may be set to zero. In various embodiments, the count number may be a number configured to track a number of a number of bins processed for cancelation signal generation. Accordingly, the count number may be used to keep track of compensation operations implemented for bins of a transmitted data packet. During operation 1306, the count number may be initialized to a value of zero.

Method 1300 may proceed to operation 1308 during which a phase may be estimated at all identified spur frequencies. Accordingly, using one of the techniques discussed above, the phase may be estimated for a particular bin at all identified spur frequencies. As also discussed above, the spur frequencies may be the second type of spur frequencies. In one example, the estimated phase may be determined by adding the estimated phase from the previous bin with an estimated slope from the calibration process. In this way, the previous estimated phase value as well as the previously determined slope may be used to estimate a phase value for a current bin. Furthermore, this may be accomplished for all identified spur frequencies. If no previous bin exists, the initial average phase may be used.

Method 1300 may proceed to operation 1310 during which a spur canceling signal may be generated for the current bin. Accordingly, as discussed above, the estimated phase and an estimated magnitude may be used to generate a canceling signal. For example, such estimated values may be used by an IFFT to generate the appropriate cancelation signal for the current bin.

Method 1300 may proceed to operation 1312 during which the generated canceling signal may be subtracted from the current bin. Accordingly, the current bin may be transmitted and combined with the generated canceling signal such that the identified spur components, which may be the second type of spur components, are removed from the transmitted signal.

Method 1300 may proceed to operation 1314 during which the count number may be incremented. In one example, the count number is a numerical value that is an integer. Accordingly, during operation 1314, the count number may be increased by a value of one.

Method 1300 may proceed to operation 1316 during which it may be determined if a count number is less than a designated number. In various embodiments, the designated number may be a total number of bins that may have been determined when the bins were created. Accordingly, the current count number may be compared with the designated number. If it is determined that the count number is less than the designated number, method 1300 may return to operation 1308. If it is determined that the count number is not less than the designated number, method 1300 may proceed to operation 1318.

Method 1300 may proceed to operation 1318 during which it may be determined if there is another data packet to be transmitted. In various embodiments, such a determination may be made based on one or more components of a wireless communications device that indicate whether or not a data packet is to be transmitted. For example, a transceiver or associated processing device may have a data packet ready for transmission. Accordingly, if it is determined that there is another data packet to be transmitted, method 1300 may return to operation 1304. If it is determined that there is not another data packet to be transmitted, method 1300 may terminate.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   beginning transmission of a portion of a data packet from a baseband layer of a wireless communications device;
   determining an estimated magnitude and an estimated phase for each of a plurality of portions of the data packet stored as a plurality of bins;
   generating a spur canceling signal based on a spur signal at identified spur frequencies of a frequency band used for the transmission, the generating being further based on the estimated magnitude and the estimated phase for the plurality of portions of the data packet;

subtracting the spur canceling signal from the transmission of the portion of the data packet; and
generating a transmitted signal based on the subtracting such that the spur canceling signal is subtracted during the transmission of the portion of the data packet.

2. The method of claim 1 further comprising:
dividing the transmission into the plurality of bins to generate the plurality of portions; and
determining an estimated magnitude and an estimated phase for each of the plurality of bins.

3. The method of claim 2 further comprising:
averaging a magnitude across the plurality of bins; and
estimating a slope of a change in phase across the plurality of bins.

4. The method of claim 3, wherein the estimating of the slope comprises:
determining a change in phase between adjacent bins across the plurality of bins.

5. The method of claim 1, wherein the estimated magnitude and the estimated phase are determined prior to the beginning of the transmission.

6. The method of claim 1, wherein the subtracting further comprises:
combining the spur canceling signal with the transmission of the portion of the data packet.

7. The method of claim 1 further comprising:
identifying a type of spur frequency.

8. The method of claim 7, wherein the identifying a type further comprises:
generating the spur canceling signal based on the identified type of spur frequency.

9. The method of claim 1, wherein the wireless communications device is compatible with a Bluetooth transmission protocol.

10. A system comprising:
a transceiver configured to transmit and receive data based on one or more wireless communications protocols; and
a processing device comprising one or more processors configured to:
begin transmission of a portion of a data packet from a baseband layer;
determine an estimated magnitude and an estimated phase for each of a plurality of portions of the data packet stored as a plurality of bins;
generate a spur canceling signal based on a spur signal at identified spur frequencies of a frequency band used for the transmission, the generating being further based on the estimated magnitude and the estimated phase for the plurality of portions of the data packet;
subtract the spur canceling signal from the transmission of the portion of the data packet; and
generate a transmitted signal based on the subtracting such that the spur canceling signal is subtracted during the transmission of the portion of the data packet.

11. The system of claim 10, wherein the one or more processors are further configured to:
divide the transmission into the plurality of bins to generate the plurality of portions; and
determine an estimated magnitude and an estimated phase for each of the plurality of bins.

12. The system of claim 11, wherein the one or more processors are further configured to:
average a magnitude across the plurality of bins; and
estimate a slope of a change in phase across the plurality of bins.

13. The system of claim 12, wherein the one or more processors are further configured to:
determine a change in phase between adjacent bins across the plurality of bins.

14. The system of claim 10, wherein the estimated magnitude and the estimated phase are determined prior to the beginning of the transmission.

15. The system of claim 10 further comprising:
a signal combiner configured to combine the spur canceling signal with the transmission of the portion of the data packet.

16. A computer program product comprising non-transitory computer-readable program code capable of being executed by one or more processors when retrieved from a non-transitory computer-readable medium, the program code comprising instructions configurable to cause the one or more processors to perform a method comprising:
beginning transmission of a portion of a data packet from a baseband layer of a wireless communications device;
determining an estimated magnitude and an estimated phase for each of a plurality of portions of the data packet stored as a plurality of bins;
generating a spur canceling signal based on a spur signal at identified spur frequencies of a frequency band used for the transmission, the generating being further based on the estimated magnitude and the estimated phase for the plurality of portions of the data packet;
subtracting the spur canceling signal from the transmission of the portion of the data packet; and
generating a transmitted signal based on the subtracting such that the spur canceling signal is subtracted during the transmission of the portion of the data packet.

17. The computer program product recited in claim 16, wherein the method further comprises:
dividing the transmission into the plurality of bins to generate the plurality of portions; and
determining an estimated magnitude and an estimated phase for each of the plurality of bins.

18. The computer program product recited in claim 17, wherein the method further comprises:
averaging a magnitude across the plurality of bins; and
estimating a slope of a change in phase across the plurality of bins.

19. The computer program product recited in claim 16, wherein the method further comprises:
identifying a type of spur frequency; and
generating the spur canceling signal based on the identified type of spur frequency.

20. The computer program product recited in claim 16, wherein the wireless communications device is compatible with a Bluetooth transmission protocol.

* * * * *